(12) United States Patent
Okaji et al.

(10) Patent No.: US 10,267,377 B2
(45) Date of Patent: Apr. 23, 2019

(54) TORQUE TRANSMISSION APPARATUS

(71) Applicant: Honda Motor Co., Ltd., Tokyo (JP)

(72) Inventors: Tomoya Okaji, Wako (JP); Fumiya Nishii, Wako (JP); Masaki Sagawa, Wako (JP); Sota Miyahara, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 84 days.

(21) Appl. No.: 15/436,663

(22) Filed: Feb. 17, 2017

(65) Prior Publication Data

US 2017/0254387 A1    Sep. 7, 2017

(30) Foreign Application Priority Data

Mar. 1, 2016  (JP) ................................. 2016-039248

(51) Int. Cl.
*F16H 45/02*   (2006.01)
*F16F 15/123*   (2006.01)

(52) U.S. Cl.
CPC .. *F16F 15/12353* (2013.01); *F16F 15/12366* (2013.01); *F16H 45/02* (2013.01); *F16H 2045/0226* (2013.01); *F16H 2045/0231* (2013.01); *F16H 2045/0278* (2013.01)

(58) Field of Classification Search
CPC .......... F16F 15/12353; F16F 15/12366; F16H 45/02; F16H 2045/0226; F16H 2045/0231; F16H 2045/0278; F16H 2045/0263
See application file for complete search history.

(56) References Cited

U.S. PATENT DOCUMENTS

2012/0080281 A1\* 4/2012 Takikawa ................ F16H 45/02
192/3.28

FOREIGN PATENT DOCUMENTS

| JP | 5051447 B2 | 10/2012 |
| JP | 2014152838 A | 8/2014 |
| JP | 2015209953 A | 11/2015 |

\* cited by examiner

*Primary Examiner* — Huan Le
(74) *Attorney, Agent, or Firm* — Duft & Bornsen, PC (57) ABSTRACT

A torque transmission apparatus including an intermediate member disposed in a power transmission path between a first rotor and second rotor; a first elastic member interposed between the first rotor and the intermediate member; a second elastic member interposed between the intermediate member and the second rotor; and an inertial body connected to the intermediate member through a third elastic member. The third elastic member is placed between the first elastic member and the second elastic member in an axial direction and between the first elastic member and the second elastic member in a radial direction.

9 Claims, 5 Drawing Sheets

FIG. 1

FRONT ←→ REAR

TORQUE TRANSMISSION APPARATUS

CROSS-REFERENCE TO RELATED APPLICATION

This application is based upon and claims the benefit of priority from Japanese Patent Application No. 2016-039248 filed on Mar. 1, 2016, the content of which is incorporated herein by reference.

BACKGROUND OF THE INVENTION

Field of the Invention

This invention relates to a torque transmission apparatus having a vibration damping function.

Description of the Related Art

As a torque converter having a lock-up mechanism, for example, an apparatus having vibration damping function is known, in order to prevent torsional vibration due to engine rotational fluctuation from transmitting directly to a transmission during operation of the lock-up mechanism. Among apparatuses of this type, the apparatus described in Japanese Examined Patent Publication No. 5051447 (JP5051447B) has a first elastic member, a main mass body and a second elastic member serially connected and interposed between a lock-up clutch and turbine runner. In addition, a dynamic damper is formed by connecting an auxiliary mass body to the main mass body through a third elastic member.

The auxiliary mass body of an apparatus described in JP5051447B is projected in the axial direction so as to be rotatable relative to the main mass body, and the third elastic member is installed between a cover plate which is fixed on the auxiliary mass body is fixed and a housing hole formed in the main mass body. Therefore, the apparatus becomes large in the axial direction, so that the apparatus is difficult to mount in situations subject to heavy layout restrictions.

SUMMARY OF THE INVENTION

According to an aspect of the present invention, a torque transmission apparatus for transmitting a torque from a first rotor rotating around an axial line to a second rotor, includes: an intermediate member disposed in a power transmission path between the first rotor and second rotor; a first elastic member interposed between the first rotor and the intermediate member; a second elastic member interposed between the intermediate member and the second rotor; a third elastic member; and an inertial body connected to the intermediate member through the third elastic member, wherein the third elastic member is placed between the first elastic member and the second elastic member in an axial direction and between the first elastic member and the second elastic member in a radial direction.

According to another aspect of the present invention, a torque converter includes: the above torque transmission apparatus; a pump impeller to which a torque from an power source is input; a cover fixed on the pump impeller; a turbine runner arranged opposite the pump impeller; a lock-up clutch including a clutch piston arranged opposite a side wall of the cover to be engaged with the cover or disengaged from the cover by driving of the clutch piston; and a turbine hub configured to output the torque from the power source through the lock-up clutch and the torque transmission apparatus to a driven component.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
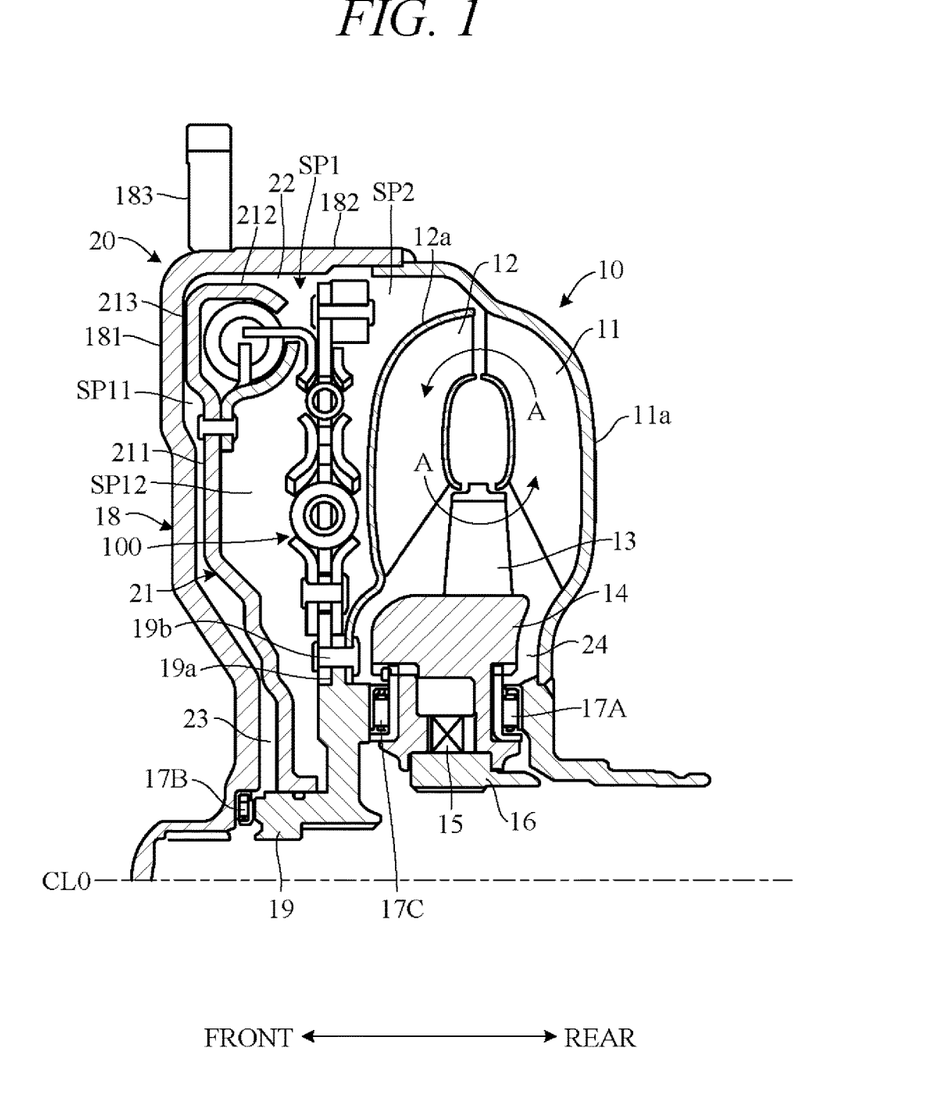
FIG. 1 is a cross-sectional diagram of a torque converter incorporating a torque transmission apparatus according to an embodiment of the present invention.

Below, referring to FIGS. 1 to 5, an embodiment of the present invention will be explained. The torque transmission apparatus according to the embodiment of the present invention is, for example, utilized in a vehicle torque converter having a lock-up mechanism. FIG. 1 is a cross-sectional view of a torque converter incorporating the torque transmission apparatus according to the embodiment of the present invention. For convenience in the following, direction of an axis CL0 shown in the drawings is defined as front-rear direction, and its components are explained in accordance with this definition.

As shown in FIG. 1, a torque converter 10 has a pump impeller 11 connected to an output shaft (crankshaft) of an engine (not shown) and a turbine runner 12 connected to an input shaft of a transmission (not shown). The pump impeller 11 and turbine runner 12 are provided in a manner rotatable around the axis CL0, respectively. The turbine runner 12 is deployed in front of and facing the pump impeller 11, and a fluid (oil) circulation passage indicated by arrows A is formed between the pump impeller 11 and the turbine runner 12.

A stator 13 is located between the pump impeller 11 and the turbine runner 12 to be radially inward of the pump impeller 11 and the turbine runner 12. The stator 13 is supported on a stator hub 14 provided radially inward thereof, and the stator hub 14 is supported on a stator shaft 16 through a one-way clutch 15. The stator shaft 16 has its inner peripheral surface non-rotatably fixed on a case (not shown) of the transmission. A thrust bearing 17A is provided between the stator hub 14 and a shell 11a of the pump impeller 11.

A cover 18 is disposed forward of the turbine runner 12. The cover 18 has a first plate section 181 extending substantially radially and a second plate section 182 bent to extend rearward from a radially outer edge of the first plate section 181. The second plate section 182 is of substantially cylindrical shape, and its rear end is joined to the shell 11a of the pump impeller 11 by welding to form a space SP1 between the cover 18 and the turbine runner 12. A boss 183 is provided to project radially outward from an outer peripheral surface of the second plate section 182, and torque from the output shaft of the engine is input to the pump impeller 11 through the boss 183 and the cover 18.

A turbine hub 19 is disposed between the stator hub 14 and the first plate section 181 of the cover 18. The input shaft of the transmission (not shown) is located radially inward of the turbine hub 19. The turbine hub 19 is fixed on the input shaft of the transmission through splines formed on its inner peripheral surface and rotates integrally with the input shaft. A thrust bearing 17B is provided between the turbine hub 19 and the cover 18, and a thrust bearing 17C is provided between the turbine hub 19 and the stator hub 14.

A flange 19a is provided to project radially outward from an outer peripheral surface of the turbine hub 19, and a radially inner edge of a shell 12a of the turbine runner 12 is fixed to a rear surface of the flange 19a by fastening members 19b such as pins. Alternatively, the shell 12a can be fixed by welding. The radially outer edge of the shell 12a is bent to extend rearward, and an extra space SP2 connecting to the space SP1 is provided radially outward of the shell 12a and radially inward of the shell 11a of the pump impeller 11.

When the pump impeller 11 of this torque converter 10 is rotated by rotation of the engine output shaft, oil flows from the pump impeller 11 to the turbine runner 12. After driving the turbine runner 12, this oil circulates through the stator 13 to the pump impeller 11. In other words, oil flows between the pump impeller 11, turbine runner 12 and stator 13 through the circulation passage "A" of FIG. 1. Owing to this oil flow, the engine output shaft rotation is transmitted to the input shaft of the transmission at reduced speed and amplified torque.

The torque converter 10 includes a lock-up clutch 20 which mechanically couples the turbine hub 19 and cover 18. The lock-up clutch 20 includes a clutch piston 21 disposed behind and facing the first plate section 181 of the cover 18. The radially inner end of the clutch piston 21 is formed annular toward the rear, and an inner peripheral surface of the clutch piston 21 fits onto the outer peripheral surface of the turbine hub 19 in a manner slidable forward and rearward, whereby the clutch piston 21 is supported to be rotatable relative to the turbine hub 19.

The clutch piston 21 has a first plate section 211 extending substantially radially and a second plate section 212 extending rearward from a radially outer edge of the first plate section 211. A front face of the first plate section 211 has a friction lining 213 attached to its radially outer end, and the clutch piston 21 and cover 18 are frictionally engageable through the friction lining 213. In the frictionally engaged state of the clutch piston 21 and cover 18, torque input to the clutch piston 21 is transmitted to the turbine hub 19 through a torque transmission apparatus 100. Although the torque transmission apparatus 100 is part of the torque converter 10 in the embodiment, its configuration is explained later herein.

The space SP1 between the pump impeller 11 and the cover 18 is partitioned by the clutch piston 21 into a front working chamber SP11 and a rear working chamber SP12. The front working chamber SP11 and rear working chamber SP12 communicate through a gap 22 between the second plate section 212 of the clutch piston 21 and the second plate section 182 of the cover 18. Oil can be supplied by a pump (not shown) into the front working chamber SP11 through a first fluid channel 23 between the cover 18 and the clutch piston 21 and into the rear working chamber SP12 through a second fluid channel 24 between the shell 11a of the pump impeller 11 and the stator hub 14. The flow of oil into the front working chamber SP11 and rear working chamber SP12 is controlled by a valve apparatus (not shown).

When oil is supplied from the pump through the first fluid channel 23 to the front working chamber SP11, pressure in the front working chamber SP11 rises above that in the rear working chamber SP12, thereby pressing the clutch piston 21 rearward. As a result, the lock-up clutch 20 is disengaged. In this state, rotation of the engine output shaft is transmitted through the cover 18 to the pump impeller 11, and further to the turbine runner 12 by oil flowing through the circulation passage "A" between the pump impeller 11, turbine runner 12 and stator 13. Rotation of the turbine runner 12 is transmitted through the turbine hub 19 to the input shaft of the transmission.

On the other hand, when oil is supplied from the pump through the second fluid channel 24 to the rear working chamber SP12, pressure in the rear working chamber SP12 rises above that in the front working chamber SP11, thereby pressing the clutch piston 21 forward. As a result, the clutch piston 21 frictionally engages the cover 18 through the friction lining 213, thereby engaging the lock-up clutch 20. That is to say, the lock-up mechanism operates. In this state, rotation of the engine output shaft is transmitted through the cover 18, clutch piston 21, torque transmission apparatus 100 and turbine hub 19 to the input shaft of the transmission. In other words, the turbine hub 19 is engaged with the cover 18 not through fluid but mechanically. As a result, torque transmission loss caused by fluid slip can be prevented.

When the clutch piston 21 and the turbine hub 19 directly connect during operation of the lock-up mechanism, torsional vibration caused by rotational fluctuation of the engine is directly transmitted to the transmission. To avoid this, the torque transmission apparatus 100 having vibration damping function is installed between the clutch piston 21 and the turbine hub 19. The torque transmission apparatus 100 is installed in a limited space rearward of the clutch piston 21 and forward of the shell 12a of the turbine runner 12 (rear working chamber SP12). So in order to prevent size-enlargement of the torque converter 10, the torque transmission apparatus 100 is preferably compactly configured while ensuring desired vibration damping function. Therefore, in the present embodiment, the torque transmission apparatus 100 is configured as follows.

Figure 2:
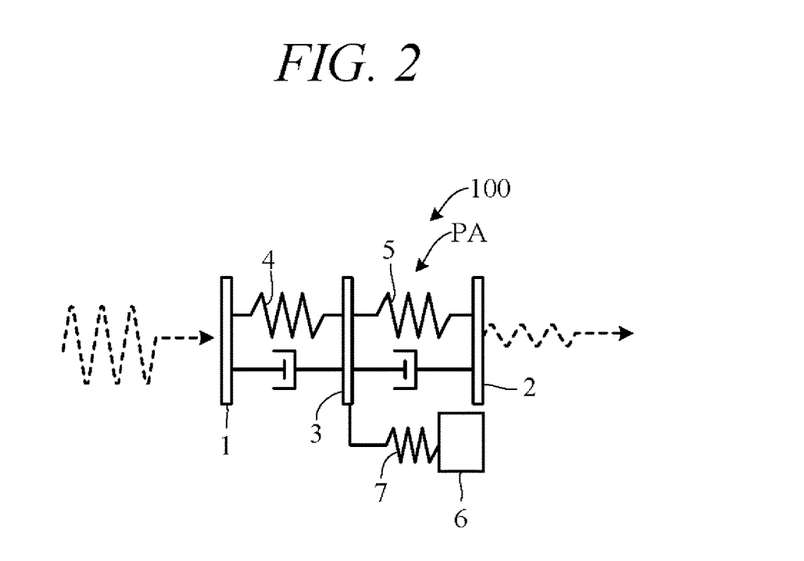
FIG. 2 is a diagram showing a vibration model of the torque transmission apparatus.

FIG. 2 is a diagram showing a vibration model of the torque transmission apparatus 100. In FIG. 2, the torque transmission apparatus 100 is generalized as one which transmits torque from a first rotor 1 (input member) to a second rotor 2 (output member). In the present embodiment, the first rotor 1 includes the clutch piston 21 and the second rotor 2 includes an output plate 60 (FIG. 4) which rotates integrally with the turbine hub 19.

As seen in FIG. 2, the torque transmission apparatus 100 includes an intermediate member 3 disposed in a power transmission path PA between the first rotor 1 and second rotor 2, a first elastic member 4 and a second elastic member 5 respectively interposed between the first rotor 1 and intermediate member 3 and between the intermediate member 3 and the second rotor 2, and an inertial body 6 connected to the intermediate member 3 through a third elastic member 7. In other words, the torque transmission apparatus 100 functions as a serial damper by serially connecting the first elastic member 4 and the second elastic member 5 via the intermediate member 3 and functions as a dynamic damper by connecting the inertial body 6 to the intermediate member 3 via the third elastic member 7.

Figure 3A:
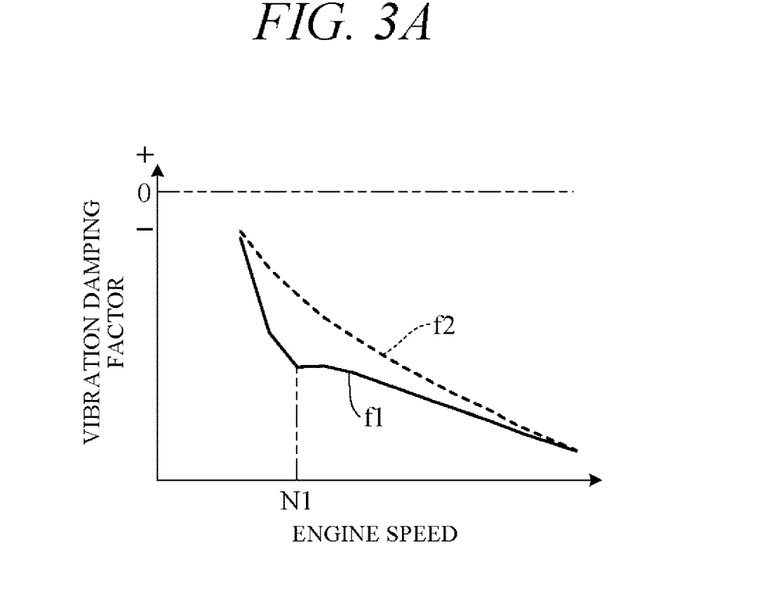
FIG. 3A is a first diagram showing a vibration damping effect attributable to difference in damper design.
Figure 3B:
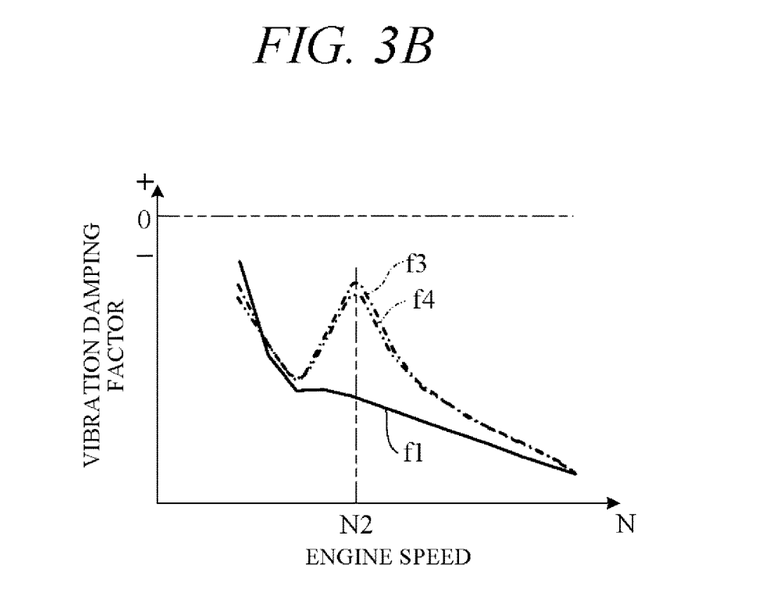
FIG. 3B is a second diagram showing a vibration damping effect attributable to difference in damper design.

FIGS. 3A and 3B are diagrams showing vibration damping effects attributable to difference in damper design. In the diagrams, the horizontal and vertical axes respectively represent engine speed N and vibration damping factor. Where vibration amplitude (maximum amplitude) of the first rotor 1 is A1 and vibration amplitude (maximum amplitude) of the second rotor 2 is A2, damping factor is defined by (A1−A2)/A1. Therefore, damping factor is represented as minus, and damping factor (damping effect) increases going downward in the diagrams. In FIGS. 3A and 3B, characteristic curve f1 (solid line curve) represents the characteristics of the torque transmission apparatus 100 of the present embodiment, characteristic curve f2 (dotted line curve) represents the characteristics of the vibration damping effect by the series damper only, characteristic curve f3 (one-dot-dashed line) represents the characteristics of the vibration damping effect when the dynamic damper is connected to the first rotor 1, and characteristic curve f4 (two-dot-dashed line) represents the characteristics of the vibration damping effect when the dynamic damper is connected to the second rotor 2.

As shown in FIG. 3A, when a series damper and dynamic damper are used in combination as in the torque transmission apparatus 100 of the present embodiment (characteristic curve f1), vibration damping effect can be enhanced in comparison with the case of only a series damper (characteristic curve f2) particularly in the vicinity of a certain rotational speed N1. Further, as seen in FIG. 3B, when a dynamic damper is connected to the first rotor 1 or second rotor 2 having large inertial mass (characteristic curves f3 and f4), vibration damping factor is degraded at a certain engine rotational speed N2 by the effect of antiresonance. In contrast, when the dynamic damper is connected to the intermediate member 3 as in this embodiment (characteristic curve f1), no effect of antiresonance arises and vibration damping effect can be enhanced.

In light of the foregoing, vibration damping effect is enhanced in the present embodiment by combined use of a series damper and a dynamic damper, with the dynamic damper being connected to the intermediate member 3. Further, in order to improve damping effect in a predetermined engine speed region, spring constant, inertial mass and the like of the dynamic damper are set in accordance with firing frequency in the engine speed region. By such a configuration, the damping performance of the torque transmission apparatus 100 can be enhanced by a simple configuration that minimizes increase in number of components.

Figure 4:
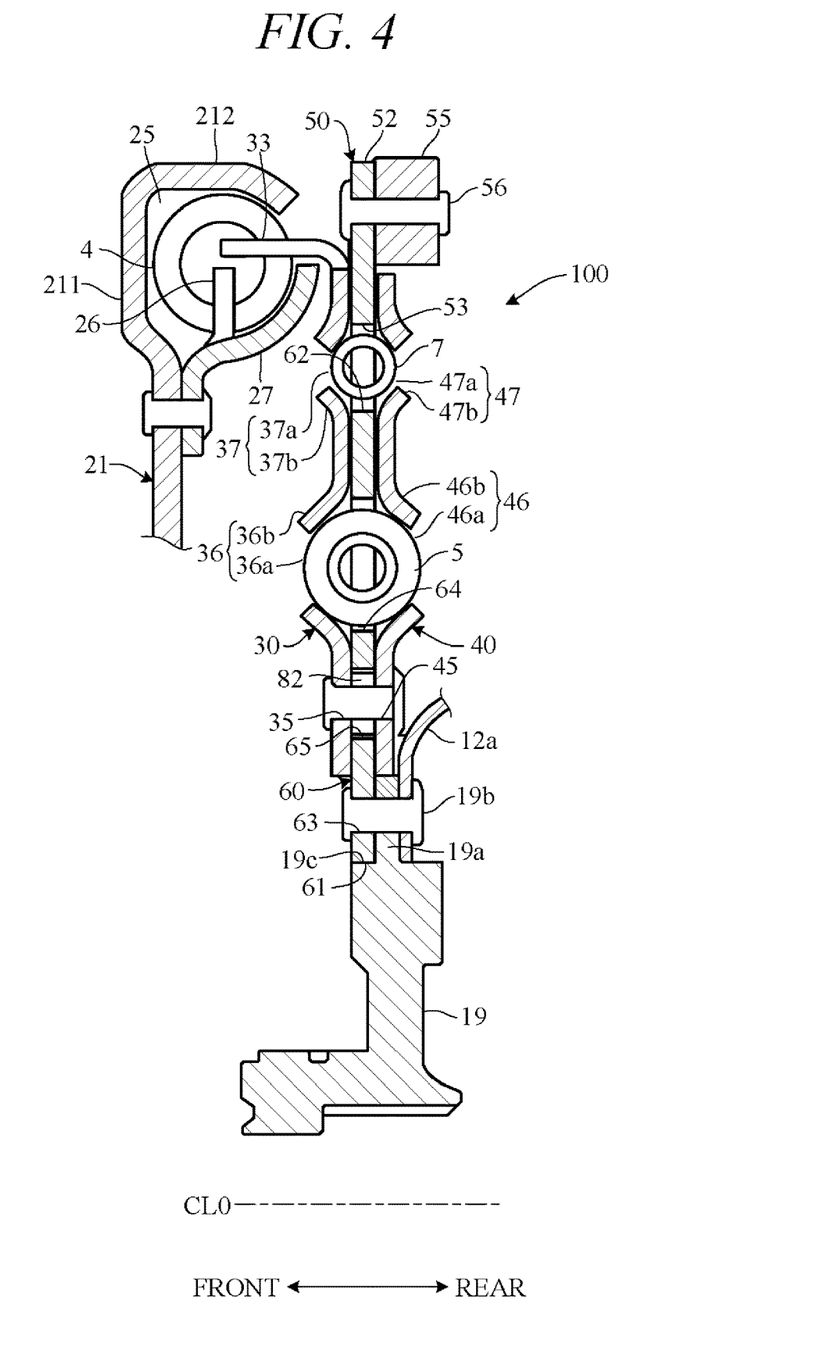
FIG. 4 is an enlarged view of the torque transmission apparatus of FIG. 1.
Figure 5:
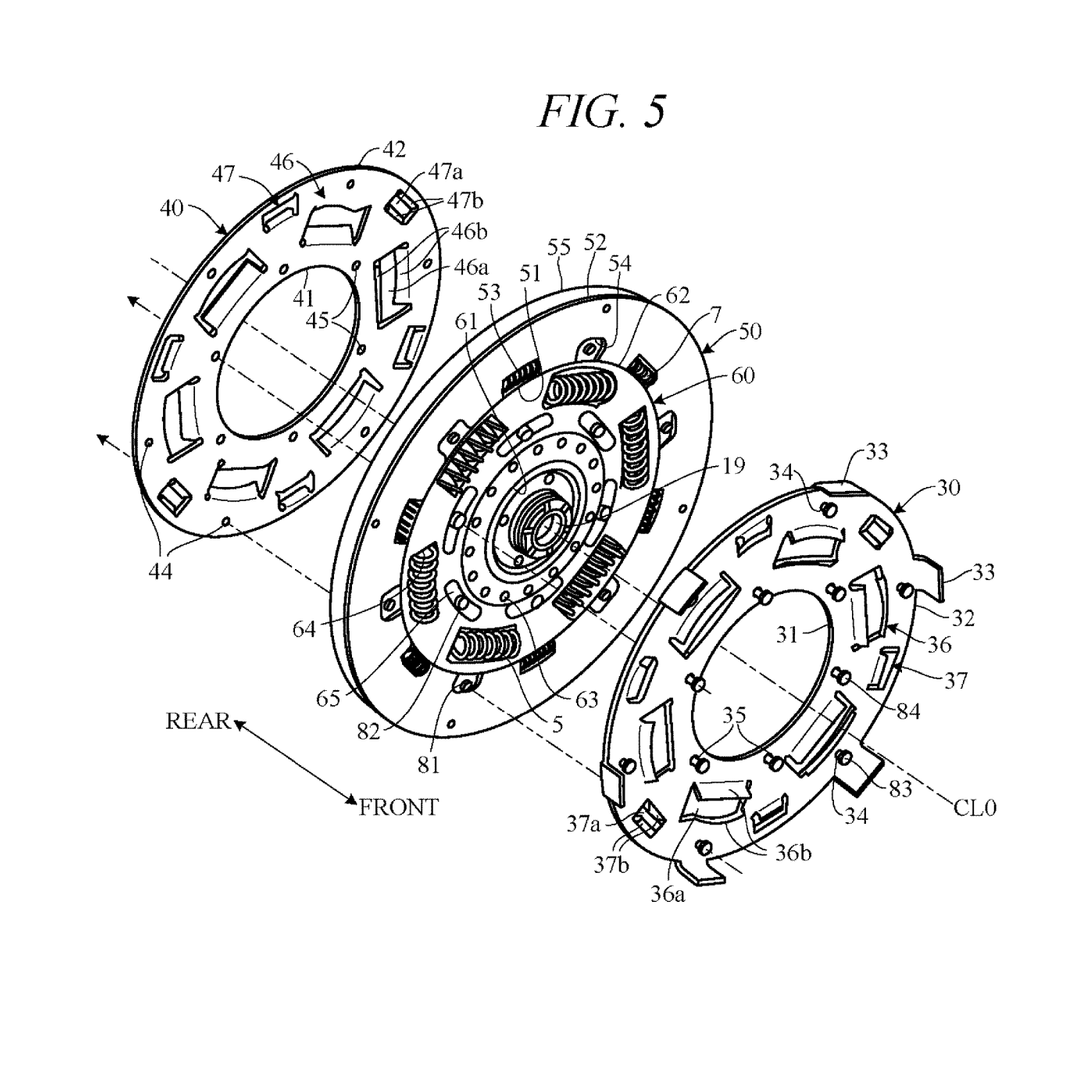
FIG. 5 is an exploded perspective view of the torque transmission apparatus of FIG. 1.

A concrete configuration of the torque transmission apparatus 100 of the present embodiment of the invention is explained next. FIG. 4 is an enlarged view of the torque transmission apparatus 100 of FIG. 1, and FIG. 5 is an exploded perspective view of the torque transmission apparatus 100. As shown in FIG. 4, a spring housing 25 is formed along the circumferential direction at the intersecting portion of the first plate section 211 and second plate section 212 of the clutch piston 21, and multiple first elastic member 4 are circumferentially housed in the spring housing 25. The first elastic member 4 is composed of coil springs.

Multiple spring supports 26 are provided on the clutch piston 21 circumferentially at a predetermined pitch, i.e., at predetermined angular spacing. The spring supports 26 are erected to project from the rear surface of the clutch piston 21 into the spring housing 25, and the longitudinal ends of the first elastic member (springs) 4 are supported by the spring supports 26. A cover 27 is attached to the rear surface of the clutch piston 21 opposite the intersecting portion of the first plate section 211 and second plate section 212 to cover the periphery of the first elastic member 4. The cover 27 is formed to have a curved shape corresponding to the circumferential surface shape of the first elastic member 4.

A pair of plate members (front plate 30 and rear plate 40) constituting the intermediate member 3, a connecting plate 50 constituting the inertial body 6, and an output plate 60 constituting the second rotor 2 are installed behind the clutch piston 21. The front plate 30 and rear plate 40 are spaced forward-rearward and extend radially in parallel. The connecting plate 50 and output plate 60 are interposed between the front plate 30 and rear plate 40. The output plate 60 is located radially inside the ring-shaped connecting plate 50 and is fastened by a fastening member 19b to a front end surface of a flange 19a of the turbine hub 19.

As shown in FIGS. 4 and 5, the front plate 30 and rear plate 40 are substantially ring-shaped and respectively have circular inner peripheral surfaces 31 and 41, and outer peripheral surfaces 32 and 42, all of which are centered on the axis CL0. Multiple (6 in the drawing) spring supports 33 are provided circumferentially to project forward from the outer peripheral surface 32 of the front plate 30 at predetermined angular intervals (60°). The spring supports 33 support the longitudinal ends of the first elastic member (springs) 4. As a result, the ends of the first elastic member (springs) 4 are supported between the spring supports 26 of the clutch piston 21 and the spring supports 33 of the front plate 30, whereby torque of the clutch piston 21 is transmitted through the first elastic member 4 to the front plate 30.

Multiple (6 each in the drawing) pin holes 34 and 44 are formed circumferentially at the radially outer sides of the front plate 30 and rear plate 40 at predetermined angular intervals (60°), and multiple (6 each in the drawing) pin holes 35 and 45 are formed circumferentially at the radially inner sides thereof at predetermined angular intervals (60°) phase-shifted by one-half pitch (30°) from the pin holes 34 and 44. Cylindrical collars 81 of predetermined length are interposed between the pin holes 34 and the pin holes 44, and cylindrical collars 82 of predetermined length are interposed between the pin holes 35 and the pin holes 45. The front plate 30 and the rear plate 40 are integrally fastened by pins 83 inserted through the pin holes 34, collars 81 and pin holes 44, and pins 84 inserted through the pin holes 35, collars 82 and pin holes 45, whereby they are spaced from each other in the forward-rearward direction by the lengths of the collars 81 and 82.

Multiple (6 each in the drawing) spring housings 36 and 46 for housing the second elastic member 5 are formed circumferentially in the front plate 30 and the rear plate 40, respectively, at predetermined angular intervals (60°), and multiple (6 each in the drawing) spring housings 37 and 47 for housing the third elastic member 7 are formed circumferentially therein at predetermined angular intervals (60°). Like the first elastic member 4, the second elastic member 5 and third elastic member 7 are composed of coil springs. For example, the second elastic member 5 can be composed of coil springs of larger diameter and length than those of the third elastic member 7, and the first elastic member 4 can be constituted of coil springs of larger diameter and length than those of the second elastic member 5. However, the dimensions of the springs of the elastic members 4, 5 and are not limited by this example.

The spring housings 36 and 46 are formed radially inward of the pin holes 34 and 44 and radially outward of the pin holes 35 and 45 to have the same phase as the pin holes 34 and 44. The spring housings 37 and 47 are formed circumferentially between adjacent pin holes 34 and 44 to have the same phase as the pin holes 35 and 45. Namely, the pin holes 34 and 44 and spring housings 36 and 46, and the pin holes 35 and 45 and spring housings 37 and 47, are formed circumferentially at equal intervals in a state shifted one-half pitch phase from each other. The spring supports 33 of the front plate 30 are formed radially outward of the pin holes 34.

The spring housings 36 and 37 of the front plate 30 are formed by press working so as to have openings 36a and 37a formed to predetermined circumferential lengths and predetermined radial lengths, and pairs of covers 36b and 37b bent forward from radially inward side rims and radially outward side rims of the openings 36a and 37a. Similarly, the spring housings 46 and 47 of the rear plate 40 are formed by press working so as to have openings 46a and 47a, and pairs of covers 46b and 47b bent rearward from rims of the openings 47a and 47a. The covers 36b and 46b are formed to project in a curved shape corresponding to the peripheral surface shape of the second elastic member (springs) 5, and the covers 37b and 47b are formed to project in a curved shape corresponding to the peripheral surface shape of the third elastic member (springs) 7. But the spring housings 36, 37, 46 and 47 are not required to be formed circumferentially and can instead be formed tangentially to circles centered on the axis CL0.

The output plate 60 is substantially ring-shaped and has an inner peripheral surface 61 and an outer peripheral surface 62, both centered on the axis CL0. The inner peripheral surface 61 is positioned radially inward of the inner peripheral surfaces 31 and 41 of the front plate 30 and rear plate 40 and is fitted on a cylindrical surface 19c on the front side of the flange 19a of the turbine hub 19. As a result, the output plate 60, in a state positioned on the turbine hub 19, is fixed on the flange 19a by fastening members 19b passed through multiple circumferentially spaced through-holes 63. Multiple (6 pieces) first slotted holes 64 of predetermined peripheral direction length are formed circumferentially in the output plate 60 at predetermined angular intervals (60°) and at the same radial positions as the spring housings 36 and 46 of the front plate 30 and rear plate 40. In addition, multiple (6 pieces) second slotted holes 65 of predetermined peripheral direction length are formed circumferentially at predetermined angular intervals (60°) and at the same radial positions as the pin holes 35 and 45 of the front plate 30 and rear plate 40.

The first slotted holes 64 and second slotted holes 65 are phase-shifted one-half pitch (30°) from each other. Alternatively, the first slotted holes 64 can be formed tangentially to a circle centered on axis CL0 rather than being formed circumferentially. Circumferential or tangential direction length of the first slotted holes 64 is substantially equal to circumferential or tangential direction length of the spring housings 36 and 46 of the front plate 30 and the rear plate 40, and the radial length (width) of the first slotted holes 64 is substantially equal to the outside diameter of the second elastic member (springs) 5. As a result, the second elastic member (springs) 5 pass through the first slotted holes 64 to be accommodated in the spring housings 36 and 46, and the opposite ends of the second elastic member (springs) 5 are supported between the spring housings 36 and 46 and the first slotted holes 64.

On the other hand, the radial length (width) of the second slotted holes 65 is substantially equal to the outside diameter of the collars 82. Therefore, the collars 82 are movable along the second slotted holes 65 in the circumferential direction, so that the output plate 60 is rotatable around the axis CL0 relative to the front plate 30 and the rear plate 40. As a result, torque input to the front plate 30 and rear plate 40 is transmitted through the second elastic member 5 to the output plate 60.

The connecting plate 50 is substantially ring-shaped and has an inner peripheral surface 51 and an outer peripheral surface 52, both centered on the axis CL0. The outer peripheral surface 52 is located radially outward of the outer peripheral surfaces 32 and 42 of the front plate 30 and rear plate 40. Thickness (forward-rearward direction length) of the connecting plate 50 is the same as thickness of the output plate 60. Diameter of the inner peripheral surface 51 of the connecting plate 50 is substantially equal to diameter of the outer peripheral surface 62 of the output plate 60, and the connecting plate 50 is fitted onto and supported by the outer peripheral surface 62 of the output plate 60. Multiple (6 pieces in the drawing) first notched holes 53 and multiple (6 pieces in the drawing) second notched holes 54 are provided circumferentially in the inner peripheral surface 51 of the connecting plate 50, alternately at predetermined angular intervals (60°) phase-shifted by half the pitch (30°).

The first notched holes 53 and second notched holes 54 are formed from the inner peripheral surface 51 toward the radially outer side to have approximately rectangular shape as seen in plan view. Circumferential or tangential direction length of the first notched holes 53 is substantially equal to circumferential or tangential direction length of the spring housings 37 and 47 of the front plate 30 and rear plate 40. The radial length of the first notched holes 53 is substantially equal to the outside diameter of the third elastic member 7. As a result, the third elastic member 7 passes through the first notched holes 53 to be accommodated in the spring housings 37 and 47, and the opposite longitudinal ends of the third elastic member 7 are supported between the spring housings 37 and 47 and the first notched holes 53.

On the other hand, the second notched holes 54 are formed to predetermined radial and circumferential lengths, and the collars 81 are inserted through the second notched holes 54. The collars 81 are movable along the second notched holes 54 in the circumferential direction, whereby the connecting plate 50 can be rotated around the axis CL0 relative to the rear plate 40 and the front plate 30. As a result, torsional vibration input to the front plate 30 and rear plate 40 acts on the third elastic member 7 and connecting plate 50 serving as a dynamic damper.

A ring-shaped mass body 55 is attached by pins 56 to a radially outer end portion of the rear surface of the connecting plate 50 so as to be centered on the axis CL0. The mass of the inertial body 6 (FIG. 2) increases as a result. The mass body 55 projects rearward from the connecting plate 50. However, the mass body 55 can be easily deployed between the clutch piston 21 and the turbine runner 12 and prevent interference with the shell 12a, because, as shown in FIG. 1, the extra space SP2 is provided radially outward of the shell 12a of the turbine runner 12.

In the above torque transmission apparatus 100, the third elastic member 7 is deployed between the first elastic member 4 and the second elastic member 5 in the axial direction and between the first elastic member 4 and the second elastic member 5 in the radial direction (FIG. 4). More specifically, the front plate 30 and the rear plate 40 are provided rearward of the first elastic member 4 to extend radially in parallel with each other and the third elastic member 7 is deployed radially inward of the first elastic member 4 and between the front plate 30 and the rear plate 40. In addition, the second elastic member 5 of greater diameter than the third elastic member 7 is deployed radially inward of the third elastic member 7 and between the front plate 30 and the rear plate 40. The torque transmission apparatus 100 can therefore be compactly configured in the axial and radial directions.

In the torque transmission apparatus 100, torque input from the engine to the clutch piston 21 when the lock-up clutch 20 is engaged is transmitted through the first elastic member 4 to the front plate 30 and rear plate 40 and is further transmitted through the second elastic member 5 to the output plate 60 and turbine hub 19. As a result, torsional vibration transmitted from the engine to the input shaft of the transmission can be attenuated by the first elastic member 4 and second elastic member 5.

At this time, torsional vibration from the engine also acts on the connecting plate 50 and mass body 55 through the third elastic member 7 connected to the front plate 30 and rear plate 40. Damping effect is therefore enhanced because vibration can also be attenuated by a dynamic damper. The function of the inertial body 6 of the dynamic damper is played not only by the mass body 55 but also by the connecting plate 50 located between the front plate 30 and the rear plate 40. The mass of the inertial body 6 can therefore easily be increased without enlarging the torque transmission apparatus 100.

The present embodiment of the invention can achieve advantages and effects such as the following:

(1) The torque transmission apparatus 100, which transmits torque from the first rotor 1 rotating around the axis CL0 to the second rotor 2, includes the intermediate member 3 disposed in the power transmission path PA between the first rotor 1 and second rotor 2; the first elastic member 4 and the second elastic member 5 respectively interposed between the first rotor 1 and intermediate member 3 and between the intermediate member 3 and the second rotor 2; the inertial body 6 connected to the intermediate member 3 through the third elastic member 7; and the spring support 8 which supports the third elastic member 7 to be expandable and contractible (FIG. 2). Moreover, the third elastic member 7 is placed between the first elastic member 4 and the second elastic member 5 in the axial direction, and between the first elastic member 4 and the second elastic member 5 in the radial direction (FIG. 4). In other words, the third elastic member 7 is placed not to exceed the axial direction range and not to exceed the radial range from the first elastic member 4 to the second elastic member 5.

Therefore, the torque transmission apparatus 100 can be compactly structured by adding the dynamic damper having the third elastic member 7 to the series damper constituted by the first elastic member 4 and the second elastic member 5 connected in series. Therefore, vibration damping function can be enhanced by the torque transmission apparatus 100, and the torque transmission apparatus 100 can be easily accommodated in the limited space inside the torque converter 10.

(2) The intermediate member 3 includes the pair of plate members constituted of the front plate 30 and the rear plate 40 which are integrally connected and extend radially in parallel, and the third elastic member 7 is interposed between the plate members 30 and 40 (FIG. 4). Since the intermediate member 3 provided between the first elastic member 4 and the second elastic member 5 thus includes the pair of plate members 30 and 40, installation space of the intermediate member 3 can be minimized, and the third elastic member 7 can be situated without axially projecting from either axial end face of the intermediate member 3.

(3) The inertial body 6 is arranged between the front plate 30 and the rear plate 40 to be rotatable relative to the front plate 30 and the rear plate 40, and has the connecting plate 50 extending radially outward from the third elastic member 7 (FIG. 4). Therefore, since the connecting plate 50 functions as part of the inertial body 6 of the dynamic damper, size of the mass body 55 attached to the connecting plate 50 can be reduced in proportion.

(4) The second rotor 2 includes the output plate 60, and the output plate 60 is interposed between the front plate 30 and the rear plate 40 to be rotatable relative to the front plate 30 and the rear plate 40 and located radially inward of the third elastic member 7 (FIG. 4). Therefore, the connecting plate 50 and the output plate 60 are situated at the same position in the axial direction, axial direction dimension of the torque transmission apparatus 100 is minimized.

(5) The inner peripheral surface 51 of the connecting plate 50 is slidably supported on the outer peripheral surface 62 of the output plate 60 (FIG. 5). Therefore, the connecting plate 50 can be stably supported between the front plate 30 and the rear plate 40 to be rotatable relative to the output plate 60. Moreover, since thickness of the connecting plate 50 and thickness of the output plate 60 are the same, the connecting plate 50 and the output plate 60 can be fabricated from a common plate material, thereby reducing component production cost.

(6) The inertial body 6 includes the annular mass body 55 attached to the outer peripheral edge portion of the connecting plate 50 (FIG. 4). Therefore, mass of the inertial body 6 can be easily increased, and space-utilization efficiency can be improved because the mass body 55 can be space-efficiently deployed in the extra space SP2 radially outside the shell 12*a* of the turbine runner 12 without enlarging the torque converter 10.

(7) The torque transmission apparatus 100 is deployed between the clutch piston 21 constituting part of the lock-up clutch 20 and the shell 12*a* of the turbine runner 12 constituting part of the torque converter 10, whereby it transmits torque from the engine through the lock-up clutch 20 of the torque converter 10 to the transmission, while the first rotor 1 is constituted by the clutch piston 21 and the second rotor 2 is constituted by the output plate 60 that rotates integrally with the input shaft of the transmission (FIGS. 1 and 4). As a result, vibration caused by rotational vibration of the engine during engagement of the lock-up clutch can be favorably reduced. Further, since in the present embodiment the torque transmission apparatus 100 can be compactly configured, the torque transmission apparatus 100 can be easily deployed between the clutch piston 21 and the shell 12*a* of the turbine runner 12 without enlarging the torque converter.

(8) The torque converter 10 includes the torque transmission apparatus 100, the pump impeller 11 input with torque from the engine, the cover 18 fixed on the pump impeller 11, the turbine runner 12 arranged opposite the pump impeller 11, the lock-up clutch 20 including the clutch piston 21 arranged opposite the side wall of the cover 18 to engage with the cover 18 and disengage from the cover 18 by driving of the clutch piston 21, and the turbine hub 19 which outputs torque from the engine through the lock-up clutch 20 and the torque transmission apparatus 100 to the transmission (FIG. 1). Since the torque transmission apparatus 100 can therefore be space-efficiently installed in the internal space of the torque converter 10 (inside the cover 18), size-enlargement of the torque converter 10 can be prevented.

In the above embodiment, the third elastic member 7 is inserted through the first notched holes 53 of the connecting plate 50 to be accommodated in the spring housings 37 and 47 of the front plate 30 and rear plate 40, and the connecting plate 50 is connected to the front plate 30 and rear plate 40 through the third elastic member 7. In this embodiment, the third elastic member 7 can be applied with initial state preload by contracting the third elastic member 7 from its natural length by a predetermined length when installed during apparatus assembly.

When preload is applied to the third elastic member 7, natural length L0 of the third elastic member (springs) 7 is longer than length L1 of the spring housings 37 and 47, and longer than length L2 of the first notched holes 53. At this time, lengths L1 of the spring housings 37, 47 and lengths L2 of the first notched holes 53 preferably satisfy L1≥L2, and more preferably satisfy L1=L2. This improves ease of apparatus assembly because, in a condition with the third elastic member (springs) 7 set in the first notched holes 53, it enables assembly of the front plate 30 and rear plate 40 with the connecting plate 50 without interfering with the spring housings 37, 47 and the third elastic member 7.

In the above embodiment, the third elastic member 7 is deployed at the same axial position as the second elastic member 5. However, the position of the third elastic member 7 is not limited to that set out above insofar as it is situated between the first elastic member 4 and the second elastic member 5, in other words, insofar as it is situated not to exceed the axial direction range from the first elastic member 4 to the second elastic member 5. For example, the third elastic member 7 can be situated rearward of the first elastic member 4 and forward of the second elastic member 5, or the third elastic member 7 can be situated at the same position in the axial direction as the first elastic member 4. Moreover, in the above embodiment, the third elastic member 7 is situated radially inward of the first elastic member 4 and radially outward of the second elastic member 5. However, the position of the third elastic member is not limited to that set out above insofar as it is situated between the first elastic member 4 and the second elastic member 5, in other words, insofar as it is situated not to exceed the radial direction range from the first elastic member 4 to the second elastic member 5. For example, the third elastic member 7 can be situated at the same position in the radial direction as the first elastic member 4 or at the same position in the radial direction as the second elastic member 5.

In the above embodiment, the intermediate member 3 is constituted by a pair of plates (front plate 30 and rear plate 40) extending orthogonally to the axis CL0. However, the intermediate member is not limited to this structure. Further, the structures of the spring housings 36, 37, 46 and 47 and the like provided on the pair of plates 30 and 40 are not limited to those set out above. In the above embodiment, the connecting plate 50 is deployed between the pair of plates 30 and 40, and the outer radial edge of the connecting plate 50 is projected beyond the plates 30 and 40. However, the connecting plate serving as the inertial plate member is not limited to the structure set out above insofar as it is installed rotatably relative to the pair of plates and to extend radially outward from the third elastic member. In the above embodiment, although the annular mass body 55 is attached to the rear surface of the connecting plate 50, the mass body is not limited to this structure. In the above embodiment, although the inertial body 6 is constituted by the connecting plate 50 and the mass body 55, the mass body can be omitted and the inertial body can be constituted solely by the inertial plate member.

In the above embodiment, the output plate 60 is provided between the pair of plates 30 and 40 to project from the inner peripheral surfaces 31 and 41 of the plates 30 and 40. However, the output plate serving as an output plate member is not limited to the structure set out above insofar as it is installed between the pair of plates to be rotatable relative to the pair of plates and radially inward of the third elastic member. In the above embodiment, although diameter of the inner peripheral surface 51 of the connecting plate 50 is substantially equal to diameter of the outer peripheral surface 62 of the output plate 60, and the inner peripheral surface 51 of the connecting plate 50 is slidably supported on the outer peripheral surface 62 of the output plate 60, the support structure of the inertial plate member is not limited to this. In the above embodiment, although the first elastic member 4, second elastic member 5 and third elastic member 7 are all composed of coil springs, at least one of them can be composed of another kind of elastic member.

In the above embodiment, the torque transmission apparatus 100 is applied to the lock-up clutch 20 of the torque converter 10 to transmit torque of the engine through the lock-up clutch 20 of the torque converter 10 to the transmission. Namely, the torque transmission apparatus 100 is applied to the power transmission path from the clutch piston 21 to the input shaft of the transmission when the lock-up clutch is engaged. However, the torque transmission apparatus can be similarly applied at other places where torque from the first rotor is transmitted to the second rotor. Therefore, the first rotor 1 can be constituted by a rotor other than the clutch piston, and the second rotor can be constituted by a rotor other than an output plate which rotates integrally with the input shaft of the transmission. For example, the first rotor can be constituted by a rotor which rotates integrally with the clutch piston, and the second rotor can be constituted by the turbine hub or the input shaft of the transmission. In other words, the first rotor and the second rotor are not limited to the structures described in the foregoing.

It is also possible to input torque to the first rotor from a power source other than an engine and to output the input torque to a driven component other than a transmission. The clutch piston 21 constituting a piston member and the cover 18 constituting a cover member are not limited to the above structures. The torque transmission apparatus can be located at a position other than between the clutch piston and shell of the turbine runner inside a cover member.

The above embodiment can be combined as desired with one or more of the aforesaid modifications. The modifications can also be combined with one another.

According to the present invention, the third elastic member constituting the dynamic damper is placed between the first elastic member and the second elastic member constituting the series damper in the axial and radial directions. Therefore, the apparatus can be compactly configured and be easily accommodated even in situations subject to heavy layout restrictions.

Above, while the present invention has been described with reference to the preferred embodiments thereof, it will be understood, by those skilled in the art, that various changes and modifications may be made thereto without departing from the scope of the appended claims.

What is claimed is:

1. A torque transmission apparatus for transmitting a torque from a first rotor rotating around an axial line to a second rotor, comprising:
    an intermediate member disposed in a power transmission path between the first rotor and second rotor;
    a first elastic member interposed between the first rotor and the intermediate member, and configured to transmit torque from the first rotor to the intermediate member;

a second elastic member interposed between the intermediate member and the second rotor, and configured to transmit torque from the intermediate member to the second rotor;

an inertial body; and a third elastic member interposed between the intermediate member and the inertial body, and configured to transmit torque from the intermediate member to the inertial body;

wherein the third elastic member is disposed rearward of the first elastic member in an axial direction, is disposed inside of the first elastic member in a radial direction, and is disposed outside of the second elastic member in the radial direction.

2. The torque transmission apparatus according to claim 1, wherein the intermediate member includes a pair of plate members extending in parallel to each other in the radial direction and integrally connected with each other, and the third elastic member is interposed between the pair of plate members in the axial direction.

3. The torque transmission apparatus according to claim 2, wherein the inertial body includes an inertial plate member interposed between the pair of plate members in the axial direction in a manner rotatable with respect to the pair of plate members and extending from the third elastic member outward in the radial direction.

4. The torque transmission apparatus according to claim 3, wherein the second rotor includes an output plate interposed between the pair of plate members in the axial direction in a manner rotatable with respect to the pair of plate members; and wherein an outer peripheral surface of the output plate is inside the third elastic member in the radial direction.

5. The torque transmission apparatus according to claim 4, wherein an inner peripheral surface of the inertial plate member is slidably supported on the outer peripheral surface of the output plate.

6. The torque transmission apparatus according to claim 3, wherein the inertial body further includes a ring-shaped mass body provided at an outer end portion of the inertial plate member.

7. The torque transmission apparatus according to claim 6, wherein the ring-shaped mass body is placed between a shell of a turbine runner of a torque converter and a cover placed on an outside of the shell in the radial direction and integrally rotating with a pump impeller of the torque converter.

8. The torque transmission apparatus according to claim 1, wherein the torque transmission apparatus is placed between a clutch piston of a lock-up clutch of a torque converter and a shell of a turbine runner of the torque converter, so as to transmit a torque from a power source through the lock-up clutch to a transmission, the first rotor includes the clutch piston or a rotor configured to integrally rotate with the clutch piston, and the second rotor includes an input shaft of the transmission or a rotor configured to integrally rotate with the input shaft.

9. A torque converter, comprising:

the torque transmission apparatus according to claim 1;

a pump impeller to which a torque from a power source is input;

a cover fixed on the pump impeller;

a turbine runner arranged opposite the pump impeller;

a lock-up clutch including a clutch piston arranged opposite a side wall of the cover to be engaged with the cover or disengaged from the cover by driving of the clutch piston; and a turbine hub configured to output the torque from the power source through the lock-up clutch and the torque transmission apparatus to a driven component.

* * * * *